United States Patent [19]

Hug

[11] 3,727,940
[45] Apr. 17, 1973

[54] SUSPENSION STRUTS FOR INDEPENDENT WHEEL SUSPENSION SYSTEMS OF MOTOR VEHICLES

[75] Inventor: Karl Hug, Niedernhausen, Germany

[73] Assignee: General Motors Corporation, Detroit, Mich.

[22] Filed: June 29, 1971

[21] Appl. No.: 157,865

[30] Foreign Application Priority Data

July 1, 1970 Germany ............... G 70 24 634.3

[52] U.S. Cl. ................. 280/124 A, 267/180, 267/34
[51] Int. Cl. ............................................. B60g 11/58
[58] Field of Search ................ 280/124 A; 267/180

[56] References Cited

UNITED STATES PATENTS 3,202,237   8/1965   Dreisziger ................. 280/124 A X
3,405,929   10/1968  Kaplan ........................... 267/180

Primary Examiner—Philip Goodman
Attorney—W. E. Finken et al.

[57] ABSTRACT

A suspension strut for an independent wheel suspension of a motor vehicle comprises a telescopic damper with a helical compression spring arranged around the damper and seated at its ends on the cylinder tube and piston rod respectively of the damper. A wheel carrier is connected to the lower end of the damper cylinder tube and projects laterally therefrom.

To compensate for the bending moment produced by the offset disposition of the wheel carrier relative to the damper axis, those portions of the convolutions of the helical spring which are disposed on the same side of the spring as the laterally projecting wheel carrier — corresponding, in use, to the outboard side of the spring convolutions — are constructed to have a greater polar resistance moment than the portions of the spring convolutions which are disposed on the opposite side of the spring from the spring carrier.

The spring starting material may for instance be circular-section spring stock, which, prior to convolution, has its cross-section locally reduced in area or changed in shape, by metal removal or by press-forming, to produce the portions having a smaller polar resistance moment.

7 Claims, 5 Drawing Figures

Inventor
Karl Hug
BY Saul Schwartz
Attorney

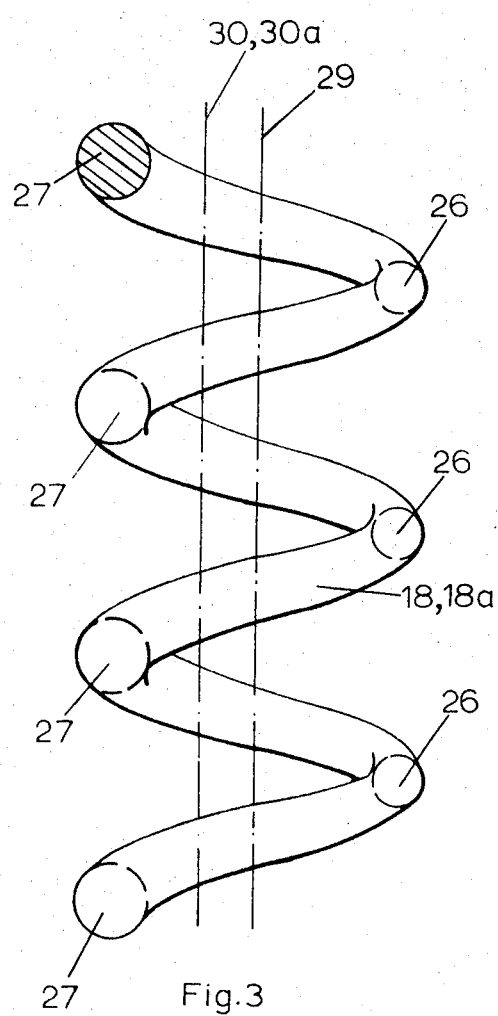
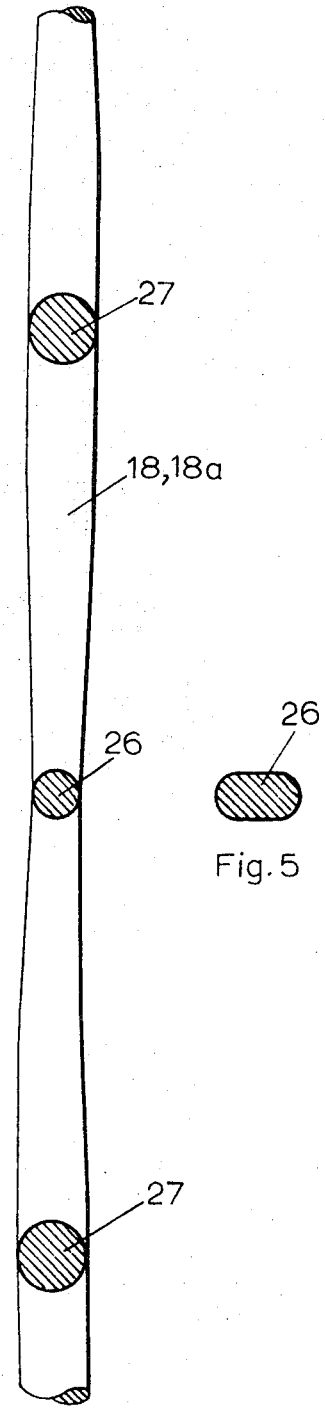

SUSPENSION STRUTS FOR INDEPENDENT WHEEL SUSPENSION SYSTEMS OF MOTOR VEHICLES

This invention relates to suspension struts for independent wheel suspension systems of motor vehicles, specifically such suspension struts as comprise a telescopic damper and, arranged therearound, a helical compression spring, the damper having a wheel carrier connected thereto and projecting laterally therefrom, and the upper end of the damper being arranged for connection to a vehicle body member.

With such an arrangement, the wheel load is applied eccentrically with respect to the axis of the suspension strut, and subjects the strut to a bending moment which tends to buckle it towards the longitudinal centre plane of the vehicle. Even when considered purely statically, this eccentric application of force leads not only to appreciable bearing forces, acting at right angles to the axis of the suspension strut, on the piston and on the piston rod guide in the cylinder of the damper, but also, as a result of deflection, to additional forces which result in increased frictional resistance in the telescopic damper, leading to a reduction in the sensitivity of the damper, such that it no longer responds to small road impacts.

For a suspension strut and wheel suspension system of the kind referred to, the invention is concerned with compensating for the bending moment in a manner which avoids any need for considerable extra outlay or increased space requirement and indeed makes possible a reduction in the space requirement in the region of the wheel, for achieving this result, the concept underlying the present invention is that the portions of the spring convolutions lying outboard (with respect to the longitudinal centre plane of the vehicle) should have a greater polar resistance moment than the inboard portions of the convolutions. Expressed another way, those portions of the convolutions of the helical spring which are disposed on the same side of the spring as the laterally projecting wheel carrier, corresponding in use to the outboard side of the spring convolutions, are to be constructed to have a greater polar resistance moment than the portions of the spring convolutions which are disposed on the opposite side of the spring from the wheel carrier.

The measure for achieving the required compensation which is utilised in conformity with the present invention causes the force axis of the helical spring to be displaced in an outboard direction, that is, in the direction towards the body of the wheel, whilst still remaining parallel to the axis of the damper. Hence the required compensation can be achieved without any need for outward displacement of the helical spring as a whole relative to the damper axis, although it is also possible for the spring to be positioned eccentrically with respect to the damper axis (if this should be deemed favourable from the aspect of construction and stress) provided that additionally the cross-sections of the spring convolutions are appropriately dimensioned in the manner already referred to, for producing a counter-bending moment which acts in opposition to the moment engendered by the wheel offset.

By appropriate dimensioning of the cross-sections of the spring convolutions, a workable construction is possible in which the spring is displaced in an inboard direction (that is, towards the middle of the vehicle): for use with a very low bonnet contour, the spring portions of the suspension strut may be disposed alongside the tyre, as illustrated in FIG. 2.

To ensure that the helical spring is uniformly stressed, and so has a potentially long useful life, it is preferably for there to be a smooth transition in cross-section between the portions of the spring convolutions with the greater polar resistance moment and the portions with a smaller polar resistance moment.

The starting material for the helical spring may be so formed (for instance, by drawing) as to take into account the differing polar resistance moments required in the coiled spring. For reasons of cost, however, it will normally be preferable to utilise a starting material having a constant cross-section throughout its length, and then bring about the required cross-sectional differentiation either by a metal-removing process or by plastic forming.

To achieve the required greater resistance moment outboard than inboard, a preferred construction is one in which the cross-section of the spring convolutions is greater outboard than inboard, preferably utilising a circular cross-section for the spring convolutions. A commercially available round-section bar material may be used as a semi-finished starting material for forming the spring.

Alternatively, the cross-section of the spring convolutions may have a different shape at the outboard and inboard portions respectively, as is illustrated in FIG. 5. Here again, if a starting material is used having a circular cross-section, it is possible by means of a particularly simple and inexpensive process, namely by working the starting material by pressing, to produce spring convolutions having a circular cross-section at the outboard portion of the spring and an elliptical, oval or flattened cross-section at the inboard portion (FIG. 5).

The precise construction and arrangement of the helical spring may be adapted to the particular application. Since there is no need to offset the spring axis relative to the damper axis, or to apply unilateral spring loading, the helical spring may surround the damper relatively closely, and the spring may have a point of application approximately mid-way along the damper. Such an arrangement is particularly suitable for passenger cars having a very low bonnet contour in the region of the front axle. Space is saved by the reduction in the spring diameter, and the result is obtained that the spring can be supported lower down alongside the wheel, without the need for a too severe increase in king-pin inclination angle for constructional reasons.

In this connection it may also be desirable for the helical spring to be of conical form with a downward taper.

The appended claims define the scope of the invention claimed. The invention and how it can be performed are hereinafter particularly described with reference to the accompanying drawings, in which:

FIG. 3 shows, to an enlarged scale, a few convolutions of a helical spring, as used in the FIGS. 1 and 2 embodiments;

FIG. 4 shows a development of the convolutions according to FIG. 3; and

FIG. 5 shows a possible alternative configuration for the cross-section of the spring convolutions.

Figure 1:
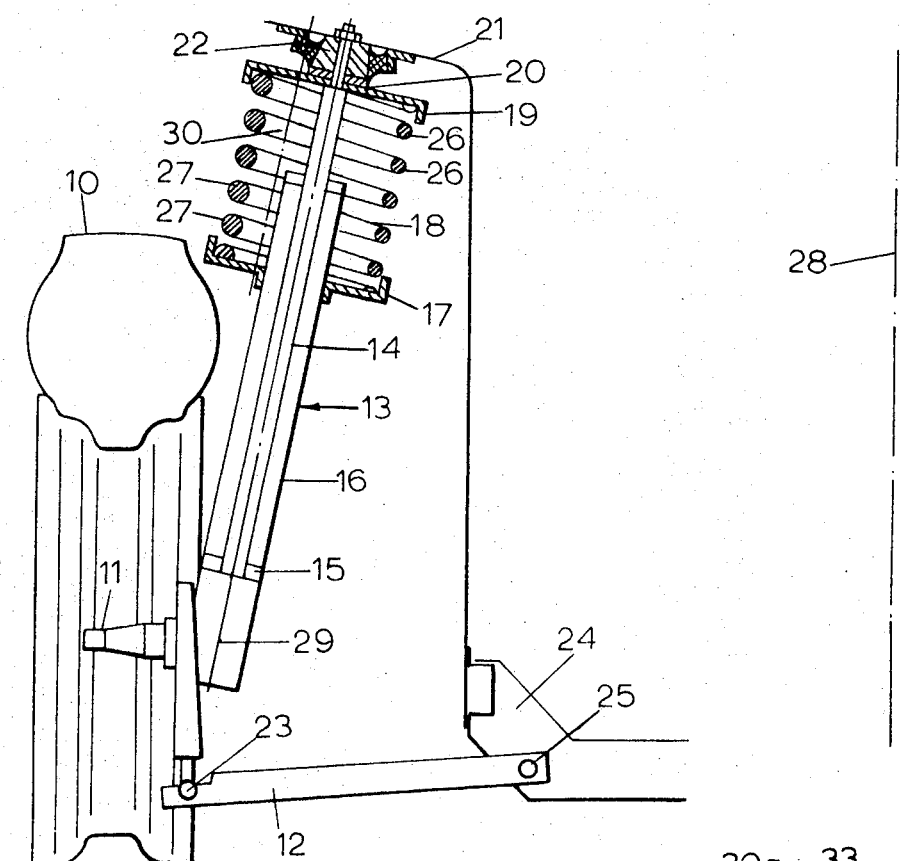
FIG. 1 is a fragmentary transverse section of one embodiment of a suspension strut and motor vehicle suspension system in accordance with the present invention.
Figure 2:
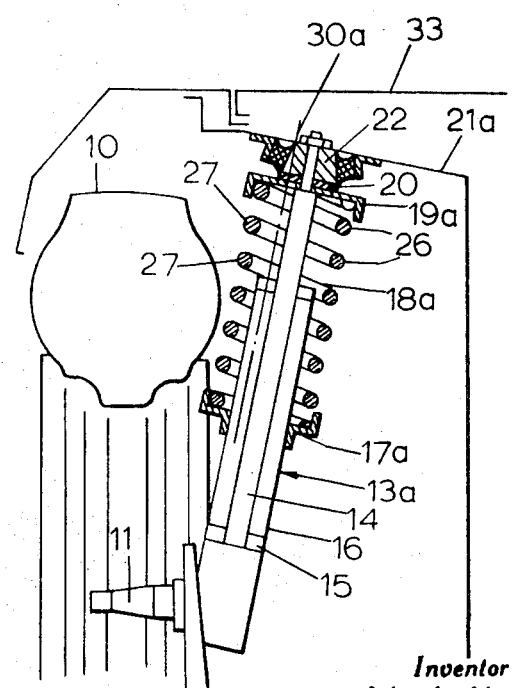
FIG. 2 is a view similar to FIG. 1 but showing the upper portion of another, modified embodiment of a strut and motor vehicle wheel suspension system.

In FIGS. 1 and 2, reference numeral 10 designates a front wheel of a motor vehicle, 11 a wheel carrier in the form of a stub axle, 12 a transverse pivotal link, and 13, 13a a suspension strut. This suspension strut 13, 13a consists of a telescopic damper (hydraulic shock absorber) having a piston rod 14, piston 15, and c cylinder tube 16, together with a helical compression spring 18, 18a which is arranged around the telescopic damper and is seated at its lower end against the shock absorber cylinder in a rotationally fixed manner, via a spring plate 17, 17a. The upper end of the helical spring 18, 18a is seated in a rotatable manner by way of a second spring plate 19, 19a against an axial thrust plate 20, which in these embodiments is plastic-covered, and is connected to the piston rod 14. The whole thus constitutes a combined spring and damper unit. The piston rod 14 is connected in a resilient and angularly movable manner to the vehicle superstructure (body) 21, 21a by way of a rubber shear element 22. At its bottom end, the damper cylinder tube 16, and thus the suspension strut, is fixedly connected to the stub axle 11, which projects laterally from the cylinder tube and, via a ball joint 23, is in turn guided by the transverse pivotal link 12 which is articulated to the vehicle chassis 24 at a hinge pivot 25.

As will be seen particularly from FIGS. 3 and 4, throughout their length the spring convolutions have cyclically varying cross-sections which vary between a minimum 26 and a maximum 27, with a steady and continuous transition. At the portions having the maximum cross-section, the spring convolutions accordingly exhibit a greater polar resistance moment than at the places of their minimum cross-section. In the coiled and mounted final condition of the helical spring 18, 18a, the portions 27 of the convolutions having the maximum cross-section 27 always lie outboard relative to the vertical longitudianl central plane of the vehicle — indicated by a dot-dash line in FIG. 1 and designated by 28 — whereas the minimum cross-sections 26 are correspondingly directed inboard.

Due to the above-described special configuration of the helical springs 18, 18a, and the arrangement with respect to the longitudinal axis 29 of the shock absorber 14, 15, 16, the force axis 30, 30a is shifted outwards parallel to the shock absorber axis 29. The helical spring 18, 18a therefore creates a bending moment which acts on the piston rod 14 of the shock absorber and counteracts, and in practice annuls, the bending moment produced by the static and dynamic wheel loading (arrow 32) applied at the wheel contact patch 31.

Whereas in the embodiments shown in FIGS. 1 to 4, the differing polar resistance moments, responsible for the offset of the force axis of the helical spring with respect to its geometric axis, are brought about by spring convolution cross-sections of identical shape (circular form) but of varying cross-sectional area, it is possible to achieve a similar effect by a cross-section of different shape. The flattened cross-section shown in FIG. 5 has been derived for example, from the circular maximum cross-section 27 by appropriate working, and is smaller than the latter by only a small amount. It has however a considerably less polar resistance moment than cross-section 27, and can therefore be used as the inward lying spring cross-section just like the minimum cross-section 26.

The embodiment of FIG. 2 is very similar to that of FIG. 1, and differs mainly in that the body contour 33 is kept very low. This construction, which would chiefly be applicable to passenger cars, is made possible by a helical spring 18a of relatively small diameter and by a correspondingly low-placed spring plate 17a.

I claim:

1. A suspension strut for an independent wheel suspension system of a motor vehicle, comprising a cylinder tube, a piston reciprocably mounted within the cylinder tube, and a piston rod secured to the piston and projecting from the cylinder tube, the cylinder tube, piston and piston rod together forming a telescopic damper, a wheel carrier connected to the cylinder tube and projecting laterally therefrom, means for connecting the piston rod to a vehicle body member, a helical compression spring arranged around the telescopic damper, and spring seat means at the ends of the spring and connected to the cylinder tube and piston rod respectively, in an arrangement in which those portions of the convolutions of the helical spring which are disposed on the same side of the spring as the laterally projecting wheel carrier are constructed to have a greater polar resistance moment than the portions of the spring convolutions which are disposed on the opposite side of the spring from the wheel carrier.

2. A suspension strut for an independent wheel suspension system of a motor vehicle, comprising a cylinder tube, a piston reciprocably mounted within the cylinder tube, and a piston rod secured to the piston and projecting from the cylinder tube, the cylinder tube, piston and piston rod together forming a telescopic damper, a wheel carrier connected to the cylinder tube and projecting laterally therefrom, means for connecting the piston rod to a vehicle body member, a helical compression spring arranged around the telescopic damper, and spring seat means at the ends of the spring and connected to the cylinder tube and piston rod respectively, in an arrangement in which those portions of the convolutions of the helical spring which are disposed on the same side of the spring as the laterally projecting wheel carrier are constructed to have a greater polar resistance moment than the portions of the spring convolutions which are disposed on the opposite side of the spring from the wheel carrier, and in which there is a smooth transition in corss-section between the portions of the spring convolutions with the greater polar resistance moment and the portions with a smaller polar resistance moment.

3. A suspension strut for an independent wheel suspension system of a motor vehicle, comprising a cylinder tube, a piston reciprocably mounted within the cylinder tube, and a piston rod secured to the piston and projecting from the cylinder tube, the cylinder tube, piston and piston rod together forming a telescopic damper, a wheel carrier connected to the cylinder tube and projecting laterally therefrom, means for connecting the piston rod to a vehicle body member, and a helical compression spring arranged around the telescopic damper, and spring seat means at the ends of the spring and connected to the cylinder tube and piston rod respectively, in an arrangement in which those portions of the convolutions of the helical spring which are disposed on the same side of the spring as the laterally projecting wheel carrier have a circular cross-section of larger cross-sectional area, and hence of greater polar resistance moment, than the portions of the spring convolutions which are disposed on the opposite side of the spring from the wheel carrier, said last-mentioned portions also having a circular cross-section, with a smooth transition in cross-section between the respective portions of the spring convolutions.

4. In a suspension strut for an independent wheel suspension system of a motor vehicle, comprising a telescopic damper and an associated helical compression spring arranged around the damper, with a wheel carrier projecting laterally from the damper, the improvement which comprises forming those portions of the convolutions of the helical spring which are disposed on the opposite side of the spring from the laterally projecting wheel carrier to have a lesser polar resistance moment than the portions of the spring convolutions which are disposed on the same side of the spring as the wheel carrier.

5. An arrangement according to claim 4, in which the portions of the spring convolutions which are disposed on the same side of the damper as the wheel carrier have a circular cross-section, and the portions on the opposite side have a flattened cross-section.

6. In a suspension strut for an independent wheel suspension system of a motor vehicle, comprising a telescopic damper and an associated helical compression spring arranged around the damper, with a wheel carrier projecting laterally from the damper, the improvement which comprises producing the helical compression spring by convoluting a spring-stock starting material which initially is of constant cross-section but subsequently is subjected to localised modification of the cross-section at predetermined intervals along the length of the spring-stock starting material corresponding generally to the circumference of the helical compression spring so that the polar resistance moment of each convolution of the helical compression spring is reduced at the localised modification.

7. An independent wheel suspension system of a motor vehicle, comprising for each of a pair of dirigible front wheels of a vehicle, a telescopic damper, an associated helical compression spring arranged around the telescopic damper and reciprocable thereby, a wheel carrier connected to the telescopic damper and projecting laterally therefrom, pivotal link means articulated to one end of the telescopic damper and adapted for pivotal connection to a vehicle body member, and resilient means connected to the other end of the telescopic damper and adapted to form an angularly movable connection to a vehicle body member, in an arrangement in which those portions of the convolutions of the helical spring which are disposed on the same side of the spring as the laterally projecting wheel carrier are constructed to have a greater polar resistance moment than the portions of the spring convolutions which are disposed on the opposite side of the spring from the wheel carrier.

* * * * *